United States Patent
Cougias et al.

(10) Patent No.: US 11,928,531 B1
(45) Date of Patent: *Mar. 12, 2024

(54) RETRIEVAL INTERFACE FOR CONTENT, SUCH AS COMPLIANCE-RELATED CONTENT

(71) Applicant: Unified Compliance Framework (Network Frontiers), Las Vegas, NV (US)

(72) Inventors: Dorian J. Cougias, Las Vegas, NV (US); Dave Dare, Las Vegas, NV (US); Lucian Hontau, Las Vegas, NV (US); Sean Kohler, Las Vegas, NV (US); Steven Piliero, Las Vegas, NV (US); Michael Wedderburn, Las Vegas, NV (US)

(73) Assignee: Unified Compliance Framework (Network Frontiers), Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/360,720

(22) Filed: Jul. 27, 2023

Related U.S. Application Data

(63) Continuation of application No. 17/389,959, filed on Jul. 30, 2021.

(60) Provisional application No. 63/223,879, filed on Jul. 20, 2021.

(51) Int. Cl.
*G06F 9/54* (2006.01)

(52) U.S. Cl.
CPC .................................. *G06F 9/547* (2013.01)

(58) Field of Classification Search
None
See application file for complete search history.

(56) References Cited

U.S. PATENT DOCUMENTS

| | | | |
|---|---|---|---|
| 4,847,766 A | 7/1989 | McRae et al. | |
| 5,715,468 A | 2/1998 | Budzinski | |
| 5,745,776 A | 4/1998 | Sheppard, II | |
| 5,819,265 A | 10/1998 | Ravin et al. | |
| 5,832,480 A | 11/1998 | Byrd, Jr. et al. | |
| 6,289,342 B1 | 9/2001 | Lawrence et al. | |
| 6,393,389 B1 | 5/2002 | Chanod et al. | |
| 6,453,315 B1 | 9/2002 | Weissman et al. | |

(Continued)

FOREIGN PATENT DOCUMENTS

| | | |
|---|---|---|
| EP | 1975837 A1 | 10/2008 |
| EP | 3404891 A1 | 11/2018 |
| WO | WO 2008121382 A1 | 10/2008 |

OTHER PUBLICATIONS

"AuditScrips—About Us," <www.auditscripts.com/about-us/>, 2011. (2 Pages).

(Continued)

*Primary Examiner* — Van H Nguyen
(74) *Attorney, Agent, or Firm* — Seed IP Law Group LLP

(57) ABSTRACT

A facility for retrieving content. The facility invokes an API, as part of the invocation passing to the API: (1) information identifying one or more units of content to return; and (2) an indication that an entity on behalf of which the invocation is performed attests that the entity is compliant with a license that applies to the identified units of content. The facility receives a response to the API invocation that contains the identified units of content.

15 Claims, 7 Drawing Sheets

(56) References Cited

U.S. PATENT DOCUMENTS

| | | | |
|---|---|---|---|
| 6,675,169 B1 | 1/2004 | Bennett et al. | |
| 6,738,780 B2 | 5/2004 | Lawrence et al. | |
| 6,823,325 B1 | 11/2004 | Davies et al. | |
| 6,966,030 B2 | 11/2005 | Ashford et al. | |
| 7,333,927 B2 | 2/2008 | Lee et al. | |
| 7,493,253 B1 | 2/2009 | Ceusters et al. | |
| 7,725,399 B2* | 5/2010 | Nakahara | H04N 21/8355 705/40 |
| 7,822,597 B2 | 10/2010 | Brun et al. | |
| 7,869,989 B1 | 1/2011 | Harvey et al. | |
| 8,019,590 B1 | 9/2011 | Kinder | |
| 8,019,769 B2 | 9/2011 | Rolle | |
| 8,108,207 B1 | 1/2012 | Harvey et al. | |
| 8,190,423 B2 | 5/2012 | Rehberg et al. | |
| 8,219,566 B2 | 7/2012 | Rolle | |
| 8,417,693 B2 | 4/2013 | Lempel et al. | |
| 8,612,466 B2 | 12/2013 | Kikuchi et al. | |
| 8,661,059 B1 | 2/2014 | Cougias | |
| 9,009,197 B2 | 4/2015 | Cougias | |
| 9,020,808 B2 | 4/2015 | Branton | |
| 9,110,975 B1 | 8/2015 | Diligenti et al. | |
| 9,123,024 B2 | 9/2015 | LeVine et al. | |
| 9,256,718 B2* | 2/2016 | Silin | G06F 21/31 |
| 9,449,353 B2* | 9/2016 | Bercow | H04L 63/10 |
| 9,575,954 B2 | 2/2017 | Cougias et al. | |
| 9,715,497 B1 | 7/2017 | Bhadbhade et al. | |
| 9,760,586 B1 | 9/2017 | Cook | |
| 9,798,753 B1 | 10/2017 | Cook | |
| 9,798,767 B1 | 10/2017 | Cook | |
| 9,846,694 B1 | 12/2017 | Cook | |
| 9,923,931 B1 | 3/2018 | Wagster | |
| 9,967,285 B1 | 5/2018 | Rossman et al. | |
| 9,977,775 B2 | 5/2018 | Cougias et al. | |
| 9,996,608 B2 | 6/2018 | Cougias | |
| 10,198,491 B1 | 2/2019 | Semturs et al. | |
| 10,353,933 B2 | 7/2019 | Cougias | |
| 10,387,575 B1 | 8/2019 | Shen et al. | |
| 10,430,317 B2* | 10/2019 | Richter | G06F 8/33 |
| 10,606,945 B2 | 3/2020 | Cougias et al. | |
| 10,769,379 B1 | 9/2020 | Cougias et al. | |
| 10,824,817 B1 | 11/2020 | Cougias et al. | |
| 10,896,211 B2 | 1/2021 | Cougias | |
| 11,120,227 B1 | 9/2021 | Cougias et al. | |
| 11,216,495 B2 | 1/2022 | Cougias | |
| 2002/0065675 A1 | 5/2002 | Grainger et al. | |
| 2002/0082717 A1* | 6/2002 | Hellberg | G06F 21/105 700/3 |
| 2002/0169771 A1 | 11/2002 | Melmon et al. | |
| 2002/0184068 A1 | 12/2002 | Krishnan et al. | |
| 2003/0067498 A1 | 4/2003 | Parisi | |
| 2004/0006466 A1 | 1/2004 | Zhou et al. | |
| 2004/0030540 A1 | 2/2004 | Ovil et al. | |
| 2004/0059932 A1 | 3/2004 | Takeuchi et al. | |
| 2004/0107124 A1 | 6/2004 | Sharpe et al. | |
| 2005/0080776 A1 | 4/2005 | Colledge et al. | |
| 2005/0080780 A1 | 4/2005 | Colledge et al. | |
| 2005/0096914 A1 | 5/2005 | Williamson et al. | |
| 2005/0138056 A1 | 6/2005 | Stefik et al. | |
| 2005/0203924 A1 | 9/2005 | Rosenberg | |
| 2005/0228799 A1 | 10/2005 | Farlow et al. | |
| 2006/0047656 A1 | 3/2006 | Dehlinger et al. | |
| 2006/0149720 A1 | 7/2006 | Dehlinger | |
| 2006/0149800 A1 | 7/2006 | Egnor et al. | |
| 2006/0259475 A1 | 11/2006 | Dehlinger | |
| 2007/0011211 A1 | 1/2007 | Reeves et al. | |
| 2007/0016583 A1 | 1/2007 | Lempel et al. | |
| 2007/0088683 A1 | 4/2007 | Feroglia et al. | |
| 2007/0118515 A1 | 5/2007 | Dehlinger | |
| 2007/0192085 A1 | 8/2007 | Roulland et al. | |
| 2007/0282592 A1 | 12/2007 | Huang et al. | |
| 2007/0283252 A1 | 12/2007 | Stuhec | |
| 2008/0091408 A1 | 4/2008 | Roulland et al. | |
| 2008/0208563 A1 | 8/2008 | Sumita | |
| 2008/0262863 A1 | 10/2008 | Stickley et al. | |
| 2008/0287142 A1 | 11/2008 | Keighran | |
| 2009/0024385 A1 | 1/2009 | Hirsch | |
| 2009/0089126 A1 | 4/2009 | Odubiyi | |
| 2009/0089195 A1 | 4/2009 | Salomon et al. | |
| 2009/0112859 A1 | 4/2009 | Dehlinger | |
| 2009/0119141 A1 | 5/2009 | McCalmont et al. | |
| 2009/0187567 A1 | 7/2009 | Rolle | |
| 2009/0265199 A1 | 10/2009 | Moerdler et al. | |
| 2010/0114628 A1 | 5/2010 | Adler et al. | |
| 2010/0145678 A1 | 6/2010 | Csomai et al. | |
| 2010/0250313 A1 | 9/2010 | Crocker et al. | |
| 2011/0112973 A1 | 5/2011 | Sanghvi | |
| 2011/0179075 A1 | 7/2011 | Kikuchi et al. | |
| 2011/0208769 A1 | 8/2011 | Kemp | |
| 2011/0225155 A1 | 9/2011 | Roulland et al. | |
| 2011/0270603 A1 | 11/2011 | Ovil et al. | |
| 2012/0036157 A1 | 2/2012 | Rolle | |
| 2012/0066135 A1 | 3/2012 | Garst et al. | |
| 2012/0072422 A1 | 3/2012 | Rollins et al. | |
| 2012/0078801 A1 | 3/2012 | Holland et al. | |
| 2012/0116984 A1 | 5/2012 | Hoang et al. | |
| 2012/0197631 A1 | 8/2012 | Ramani et al. | |
| 2013/0047221 A1 | 2/2013 | Warnock et al. | |
| 2013/0091486 A1 | 4/2013 | Gemmell et al. | |
| 2013/0226662 A1 | 8/2013 | LeVine et al. | |
| 2013/0297477 A1 | 11/2013 | Overman et al. | |
| 2013/0346302 A1 | 12/2013 | Purves et al. | |
| 2014/0032209 A1 | 1/2014 | Etzioni et al. | |
| 2014/0046892 A1 | 2/2014 | Gopalakrishnan et al. | |
| 2014/0052617 A1 | 2/2014 | Chawla et al. | |
| 2014/0244524 A1 | 8/2014 | Brestoff et al. | |
| 2014/0310249 A1 | 10/2014 | Kowalski | |
| 2015/0012402 A1 | 1/2015 | Buck | |
| 2015/0066478 A1 | 3/2015 | Onishi et al. | |
| 2015/0142682 A1 | 5/2015 | Ghaisas et al. | |
| 2015/0220621 A1 | 8/2015 | Cougias | |
| 2015/0249651 A1 | 9/2015 | Okamoto et al. | |
| 2016/0306789 A1 | 10/2016 | Cougias et al. | |
| 2016/0350283 A1 | 12/2016 | Carus et al. | |
| 2016/0371618 A1 | 12/2016 | Leidner et al. | |
| 2017/0075877 A1 | 3/2017 | Lepeltier | |
| 2017/0147635 A1 | 5/2017 | McAteer et al. | |
| 2017/0178028 A1 | 6/2017 | Cardonha et al. | |
| 2017/0220536 A1 | 8/2017 | Chiba et al. | |
| 2017/0236129 A1 | 8/2017 | Kholkar et al. | |
| 2017/0300472 A1 | 10/2017 | Parikh et al. | |
| 2018/0053128 A1 | 2/2018 | Costas | |
| 2018/0101779 A1 | 4/2018 | Canim et al. | |
| 2018/0314754 A1 | 11/2018 | Cougias | |
| 2018/0357097 A1 | 12/2018 | Poort et al. | |
| 2018/0373691 A1 | 12/2018 | Alba et al. | |
| 2019/0080018 A1 | 3/2019 | Pilkington et al. | |
| 2019/0080334 A1 | 3/2019 | Copeland et al. | |
| 2019/0163778 A1 | 5/2019 | Brown et al. | |
| 2019/0188400 A1 | 6/2019 | Vandervort | |
| 2019/0260694 A1 | 8/2019 | Londhe et al. | |
| 2019/0286642 A1 | 9/2019 | Cougias | |
| 2019/0286643 A1 | 9/2019 | Cougias | |
| 2020/0050620 A1 | 2/2020 | Clark et al. | |
| 2020/0111023 A1 | 4/2020 | Pondicherry Murugappan et al. | |
| 2020/0176098 A1 | 6/2020 | Lucas et al. | |
| 2020/0327285 A1 | 10/2020 | Cox et al. | |
| 2021/0004535 A1 | 1/2021 | Cougias et al. | |
| 2021/0149932 A1 | 5/2021 | Cougias | |
| 2021/0365638 A1 | 11/2021 | Cougias et al. | |
| 2022/0067290 A1 | 3/2022 | Cougias et al. | |
| 2022/0159093 A1 | 5/2022 | Joshi et al. | |
| 2023/0031040 A1 | 2/2023 | Cougias et al. | |
| 2023/0075614 A1 | 3/2023 | Cougias et al. | |

OTHER PUBLICATIONS

"CSA Cloud Security Alliance—History," <cloudsecurityalliance.org/history/>, 2010, (2 Pages).
"HITRUST Common Security Framework Matures with Enhancements for 2010," Feb. 1, 2010, 4 pages. <hitrustalliance.net/hitrust-common-security-framework-matures-enhancements-2010/>.
"ISF Information Security Forum," <securityforum.com/about/>, first published 2007, (3 Pages).

(56) References Cited

OTHER PUBLICATIONS

Baldwin et al., "Chapter 1—Multiword Expressions," *Handbook of Natural Language Processing*, Second Edition:1-40, 2010.
Cloud Security Alliance, "Security Guidance for Critical Areas of Focus in Cloud Computing V2.1," Dec. 2009, 76 pages.
Devlin et al., "BERT: Pre-training of Deep Bidirectional Transformers for Language Understanding," Cornell University, 2018, 14 pages.
Ferrari et al., "Detecting requirements defects with NLP patterns: an industrial experience in the railway domain," *Empirical Software Engineering* 23:3684-3733, 2018.
Final Office Action for U.S. Appl. No. 16/432,634, dated Oct. 12, 2021, 10 pages.
Final Office Action for U.S. Appl. No. 16/432,634, dated Oct. 12, 2021, 17 pages.
Final Office Action for U.S. Appl. No. 16/432,737, dated Feb. 11, 2021, 10 pages.
Final Office Action for U.S. Appl. No. 16/459,385, dated Apr. 23, 2021, 17 pages.
Final Office Action for U.S. Appl. No. 17/160, 175, dated May 11, 2023, 18 pages.
Final Office Action for U.S. Appl. No. 17/389,959, dated May 18, 2022, 18 pages.
Gharbieh et al., "Deep Learning Models For Multiword Expression Identification," *Proceedings of the 6th Joint Conference on Lexical and Computational Semantics*, Canada, Aug. 3-4, 2017, pp. 54-64.
International Preliminary Report on Patentability for International Application No. PCT/US2016/026787, dated Oct. 24, 2017 (10 pages).
International Search Report and Written Opinion for International Application No. PCT/US2013/068341, dated Feb. 26, 2014, 9 pages.
International Search Report and Written Opinion for International Application No. PCT/US2016/026787, dated Jul. 22, 2016, 13 pages.
International Search Report and Written Opinion for International Application No. PCT/US2021/048088, dated Feb. 9, 2022, 13 pages.
International Search Report, dated Nov. 8, 2022, for International Patent Application No. PCT/US2022/037624. (3 pages).
Lan et al., "ALBERT: A Lite Bert for Self-Supervised Learning of Language Representations," arXiv preprint arXiv:1909.11942, 2019, 17 pages.
Masini, F., "Multi-Word Expressions and Morphology," Oxford Research Encyclopedias, 2019, 30 pages.
Mikolov et al., "Distributed Representations of Words and Phrases and their Compositionality," Advances in neural information processing systems:3111-3119, 2013.
Neumann et al., "An Analysis of Public REST Web Service APIs," 97/1/2021, IEEE Transactions on Services Computing, vol. 14, No. 4, Jul./Aug. 2021, pp. 957-970 (Year: 2021).
Non Final Office Action for U.S. Appl. No. 13/952,212, dated Oct. 15, 2013, 7 pages.
Non Final Office Action for U.S. Appl. No. 16/432,634, dated Feb. 5, 2021, 7 pages.
Non Final Office Action for U.S. Appl. No. 16/932,609, dated May 3, 2022, 16 pages.
Non Final Office Action for U.S. Appl. No. 17/160,175, dated Dec. 6, 2022, 33 pages.
Non-Final Office Action for U.S. Appl. No. 17/460,054, dated Nov. 15, 2021, 5 pages.
Notice of Allowance for U.S. Appl. No. 17/460,054, dated Mar. 7, 2022, 12 pages.
Office Action for U.S. Appl. No. 16/459,385, dated Apr. 23, 2021, 17 pages.
Pennington et al., "GloVe: Global Vectors for Word Representation," Proceedings of the 2014 Conference on Empirical Methods in Natural Language Processing (EMNLP): 1532-1543, 2014.
Peters et al., "Deep contextualized word representations," arXiv preprint arXiv:1802.05365v2, 2018, 15 pages.
Proffitt, Tim, "Meeting Compliance Efforts with the Mother of All Control Lists (MOACL)," SANS Institute Information, Security Reading Room, 2010, 56 pages.
Radford et al., "Improving Language Understanding by Generative Pre-Training," 2018 (Retrieved from s3-us-west-2.amazonaws.com on Sep. 14, 2021.).
Ramshaw et al., "Text Chunking Using Transformation-Based Learning," Natural language processing using very large corpora, Springer, 1999, 157-176.
Ratinov et al., "Design Challenges and Misconceptions in Named Entity Recognition," Proceedings of the Thirteenth Conference on Computational Natural Language Learning (CoNLL):147-155, 2009.
Rohanian at al., "Bridging the Gap: Attending to Discontinuity in Identification of Multiword Expressions," Cornell University, 2019, 7 pages.
Schneider et al., "SemEval-2016 Task 10: Detecting Minimal Semantic Units and their Meanings (DiMSUM)," Proceedings of SemEval:546-559, 2016.
Škvorc et al., "MICE: Mining Idioms with Contextual Embeddings," Aug. 14, 2020, pp. 1-23.
Suissas, "Verb Sense Classification," Thesis to obtain the Master of Science Degree in Information Systems and Computer Engineering:1-72, Oct. 2014.
Vaswani et al., "Attention Is All You Need," 31st Conference on Neural Information Processing Systems, 2017, 11 pages.
Wahl, "The Distributional Learning of Multi-Word Expressions: A Computational Approach," Dissertation: 1-190, Jun. 2015.
Wikipedia, "Frequency (statistics)", 4 pages, downloaded Mar. 11, 2020. (Year: 2020).
Wikipedia, "Word lists by frequency", 10 pages, downloaded Mar. 11, 2020. (Year: 2020).

* cited by examiner

RETRIEVAL INTERFACE FOR CONTENT, SUCH AS COMPLIANCE-RELATED CONTENT

CROSS-REFERENCE TO RELATED APPLICATIONS

This application claims the benefit of provisional U.S. Application No. 63/223,879, filed Jul. 20, 2021 and entitled "RETRIEVAL INTERFACE FOR CONTENT, SUCH AS COMPLIANCE-RELATED CONTENT," which is hereby incorporated by reference in its entirety.

This application is related to U.S. patent application Ser. No. 16/459,385, filed Jul. 1, 2019 (now U.S. Pat. No. 11,120,227), which is hereby incorporated by reference in its entirety.

In cases where the present application conflicts with a document incorporated by reference, the present application controls.

BACKGROUND

Content is data intended for consumption. One example is content that can be rendered in a form perceptible to a person for the person's consumption, including such forms as text, images, audio sequences, video sequences, and holography sequences. Another example is content that is consumed by a computer, under the control of software; such content may be, for example, database rows, sensor outputs, or data about stock trading or other transactions.

Various conventional interfaces enable the retrieval of units of content in a particular body of content, in some cases units of content requested by software executed by or on behalf of a wide variety of organizations. As one example, web servers receive HTTP requests submitted by web browsers executing on many computers that each identify a web page that is part of a particular website; the web servers respond to each request with the content of the web page that it identifies. In some cases, conventional content retrieval interfaces are equipped with a pay wall that requires that a requester pay a subscription fee before responses will be sent to their requests.

DETAILED DESCRIPTION

Figure 1:
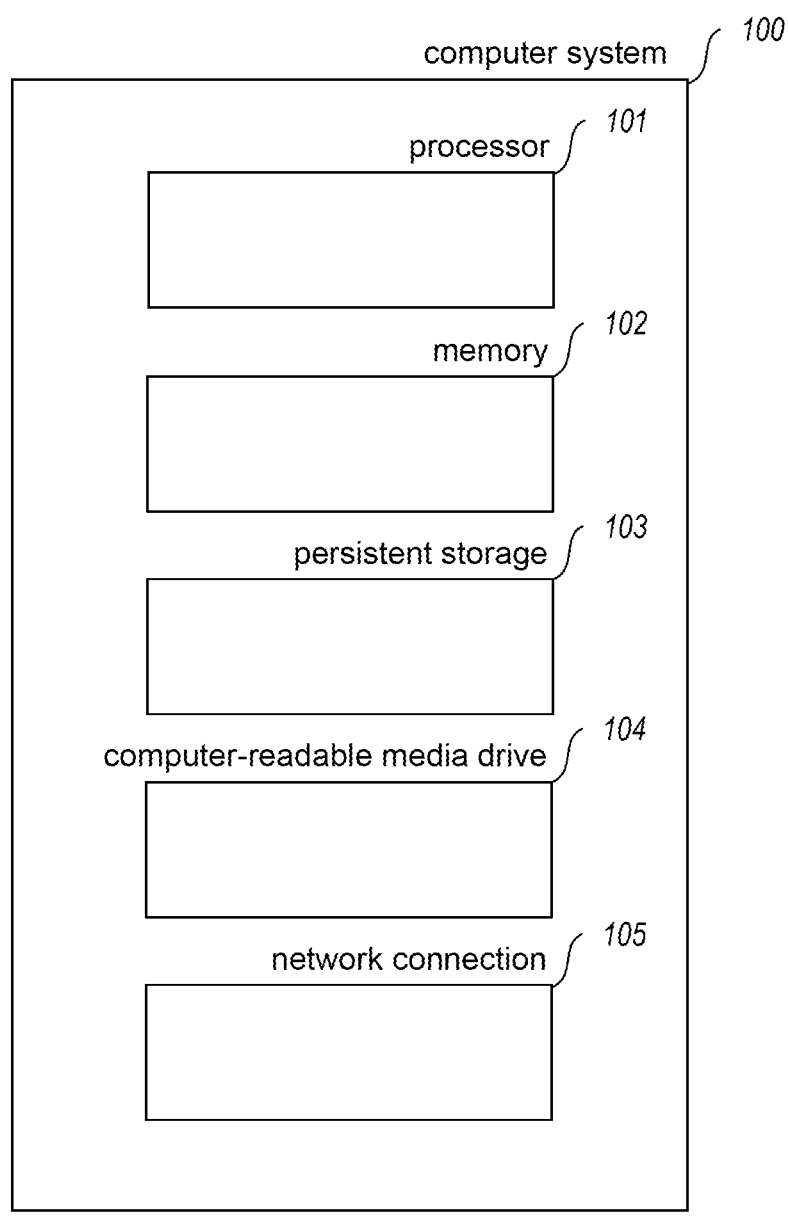
FIG. 1 is a block diagram showing some of the components typically incorporated in at least some of the computer systems and other devices on which the facility operates.

The inventors have recognized disadvantages of conventional content retrieval interfaces. One is that the subscription model typically used by conventional content retrieval interfaces is a poor fit for many types of content, content providers, and/or content consumers. For example, the all-you-can-eat model encourages inefficient use of the interface, to request more content units than is necessary, or to request the same content unit more times than is necessary. Additionally, in some cases, subscribers may retrieve a substantial portion of the body of content in order to resell it without further compensating the content provider, to customers who would otherwise have paid the content provider for subscription. Further, subscription rates that the content provider regards as adequate compensation for the all-you-can-eat model may be so large as to preclude perspective customers who wish to retrieve only a small volume of content. Many of these disadvantages are shared by measured subscription models in which customers pay a subscription fee in exchange for the ability to retrieve up to a maximum volume of content.

The inventors have also recognized that a significant portion of content is subject to license agreements. For example, a license agreement may require those who access the content that is subject to the license agreement to only store, copy, modify, transform, or distribute the content in certain ways, or under certain conditions, or that they pay for the opportunity to do so, or undertake some other obligation in exchange for doing so. They have further recognized that failure of conventional content retrieval interfaces to enforce license agreements against the retrieval of content that is subject to them is disadvantageous to the provider of the licensed content, and may discourage the provider from making the licensed content available via the retrieval interface.

The inventors have further recognized that the disadvantages of conventional content retrieval interfaces listed above are particularly acute with respect to providing content retrieval for information relating to compliance.

Compliance refers to facilitating an organization's adherence to rules of various kinds that govern their business, and assessing ("auditing") that adherence. These rules are expressed in authority documents, which can include, for example: statutes, regulations, regulatory directives or guidance, contractual obligations, standards, auditing guidelines, safe harbors, best practice guidelines, vendor documentation, and procedures established by the organization for its own operation. In some cases, a compliance process involves some or all of the following phases: selecting and obtaining copies of a group of authority documents that applies to the organization; identifying the expressions of rules ("citations") that occur in the authority documents; performing natural language understanding analysis of the citations to determine the rules ("mandates") that they express; deduplicating the mandates across the group of authority documents—and within individual authority documents—to obtain "controls" (or "common controls") that each represent a set of mandates that are equivalent, and are each linked to that set of mandates; constructing an audit questionnaire from the controls that efficiently covers compliance with all of the authority documents in the group; and using the established structure of citations, mandates, controls, and audit questions and answers to establish that the answers to audit questions demonstrate compliance with the authority documents in the group. In some cases, documents, citations, mandates, and/or controls are constructed with reference to data objects called "terms" that constitute dictionary entries for words or phrases occurring in those higher-level data objects.

In some cases, a service provider performs some or all of the compliance process phases listed above on behalf of organizations that are customers of the service provider. In some cases, customers may wish to access intermediate data that is produced by the service provider as part of providing the service. This may be, for example, in cases where the customer organization wishes to rely on the service provider for early phases of the compliance process, and perform later phases itself using the results of the service provider's performance of the early phases, in some cases using a third-party tool or repository. This may also be in cases where the customer organization wishes to independently assess or verify the correctness of the structure of citations, mandates, controls, and audit questions established on its behalf by the service provider, or store a record of these that it can access in the future.

In response to recognizing the above disadvantages of conventional content retrieval interfaces, the inventors have conceived and reduced to practice a software and/or hardware facility ("the facility") that provides a superior retrieval interface for content, such as compliance-related content.

The facility exposes an API that content consumers can call in order to retrieve units of content. In some embodiments, the facility enables content consumers to retrieve units of content of different types, such as by exposing different API endpoints for different content types, or by establishing an argument that the calling content consumer can set in order to specify content type. In some embodiments, these multiple content types include compliance information objects, such as authority document lists, authority documents, citations, mandates, controls, and terms.

In some embodiments, the facility imposes a license enforcement mechanism via the API. For example, in some embodiments, the API provided by the facility enables callers to identify a license that applies to a particular unit of content, such as by returning a URL at which that license can be accessed, or other pointer to that license. In some embodiments, the API includes a license attestation argument that the caller must populate with a value indicating that it attests that it understands the license and is complying with it. In some embodiments, the API includes a license key argument that the caller populates with a key identifying the caller to the licensor of the unit of content; the API uses the license key to verify that the caller has a license in good standing with the licensor before returning the requested unit of content.

In some embodiments, the facility charges callers for the units of content they retrieve. In such embodiments, the facility establishes a price list that specifies the price for individual content units, content units of particular content types, or units of content from particular sources or in particular authority documents. As part of responding to a content retrieval request from a caller, the facility causes the caller to be charged the appropriate amount for each requested content unit. In various embodiments, the charging involves debiting a prepayment account of the caller, performing credit or debit transactions using information previously provided by the caller, or other approaches to charging. In some embodiments, an API gateway is used by the facility to authenticate the identity of the caller and charge a method of payment established by the caller, such as by charging a credit card provided by the caller, or decrementing a debit account previously funded by the caller.

By performing in some or all of the ways described above, the facility facilitates the retrieval of compliance-related information and content of other types in a way that enforces licenses that apply to the content, and/or charges appropriately for the content. These features make it more attractive for content providers to use the facility for distribution of their content.

Also, the facility improves the functioning of computer or other hardware, such as by reducing the dynamic display area, processing, storage, and/or data transmission resources needed to perform a certain task, thereby enabling the task to be performed by less capable, capacious, and/or expensive hardware devices, and/or be performed with less latency, and/or preserving more of the conserved resources for use in performing other tasks or additional instances of the same task. For example, the facility conserves processing and communication resources that would have been applied to lesser-valued content retrieval requests that customers would have made under a subscription payment arrangement, but do not make on a per-unit payment arrangement. As a result, cheaper, less powerful portable servers can be substituted to achieve the same level of performance, or the same servers can be used with excess processing capacity remaining for performing additional desirable tasks.

FIG. 1 is a block diagram showing some of the components typically incorporated in at least some of the computer systems and other devices on which the facility operates. In various embodiments, these computer systems and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 101 for executing computer programs and/or training or applying machine learning models, such as a CPU, GPU, TPU, NNP, FPGA, or ASIC; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
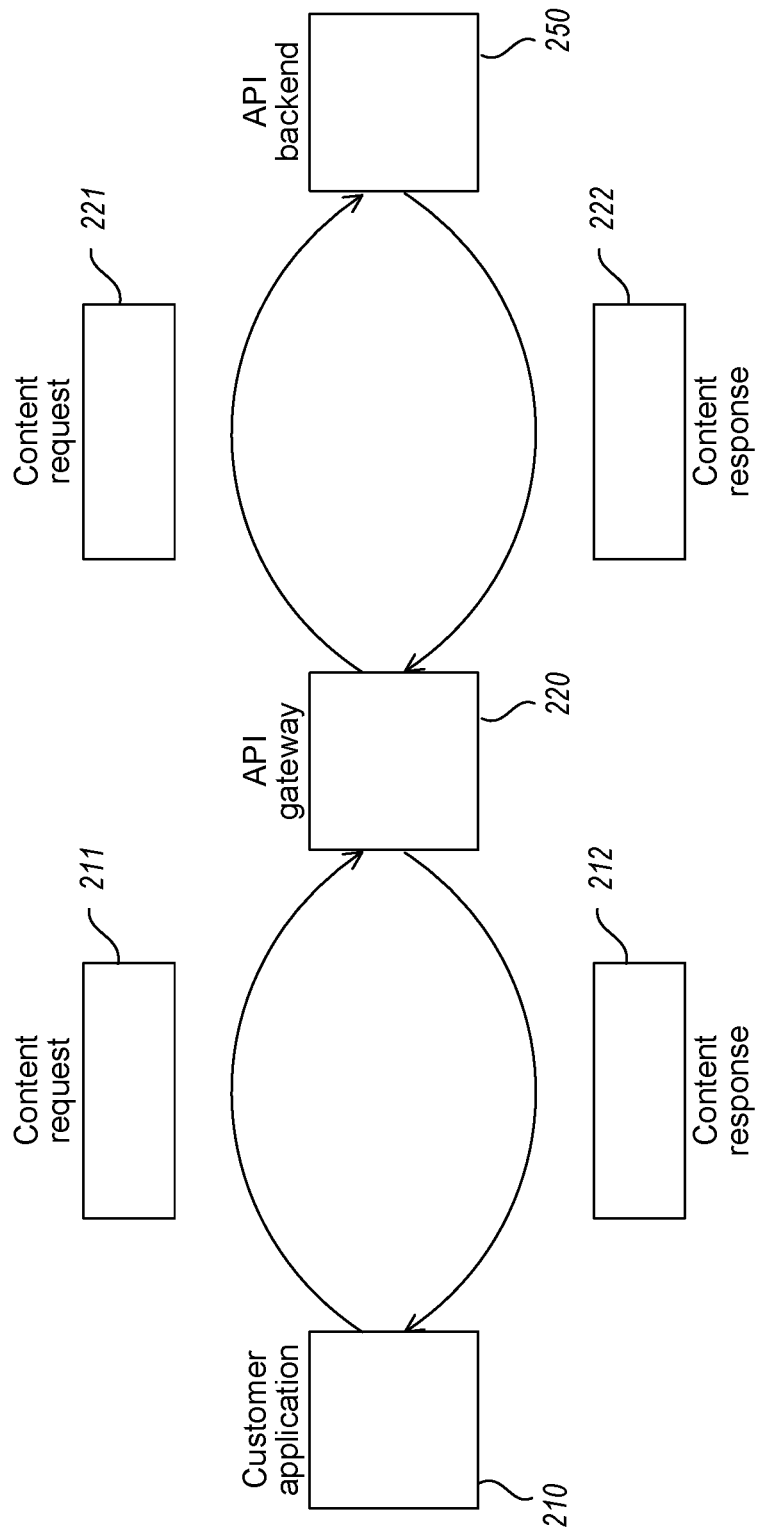
FIG. 2 is a data flow diagram showing the facility's processing of a content request at a high level.

FIG. 2 is a data flow diagram showing the facility's processing of a content request at a high level. A customer application 210 wishing to retrieve content, such as compliance-related content, sends a content request 211 to an API gateway 220. The API gateway dispatches the content request 221 to an API backend 250 that implements content retrieval API exposed by the facility. The API backend generates a content response 222 containing the content identified by the content request, which it returns to the API gateway. The API gateway in turn forwards content response 212 to the customer application.

In various embodiments, the API gateway is a commercial API gateway such as rapid API or KrakenD, configured to operate with the facility; an open-source API gateway, such as Kong, some or all of whose modules are adapted or rebuilt to operate with the facility; or an API gateway developed from scratch specifically to operate with the facility at the API gateway.

Figure 3:
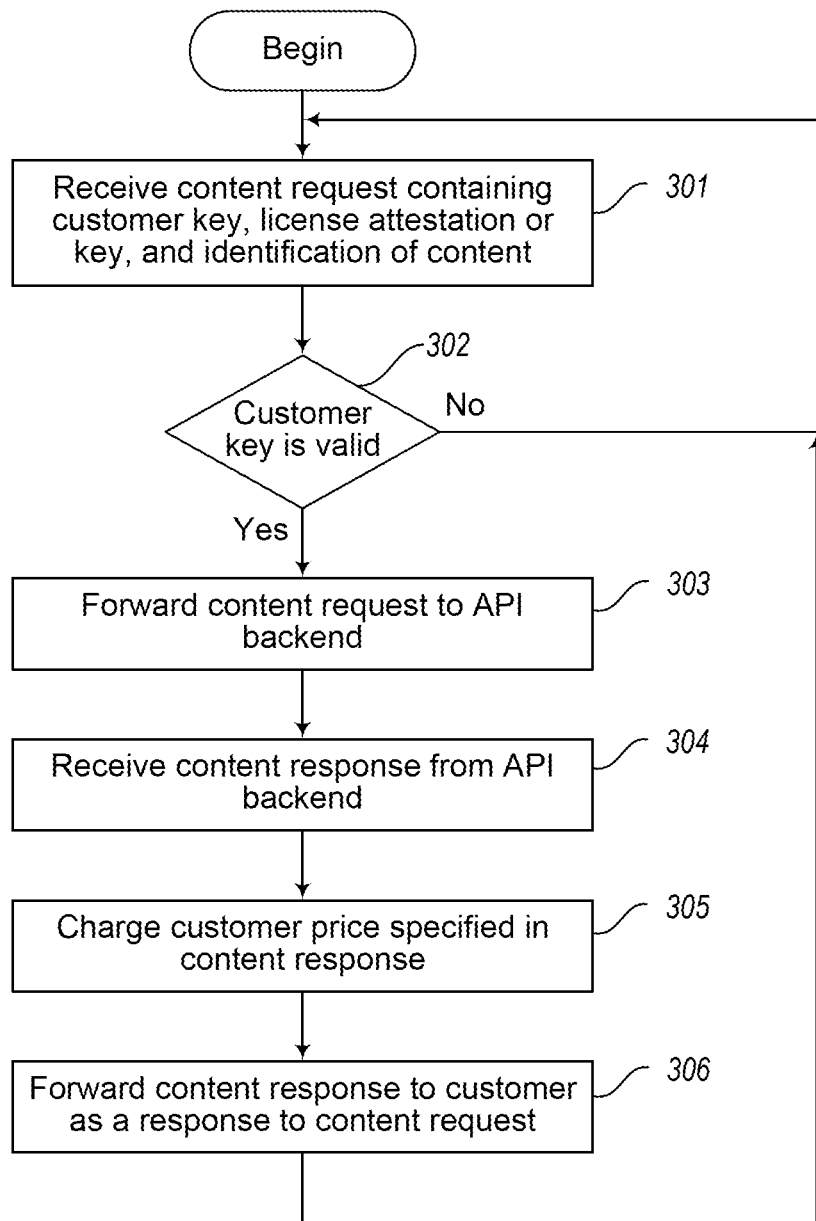
FIG. 3 is a flow diagram showing a process performed by the facility in some embodiments in the API gateway.
Figure 4:
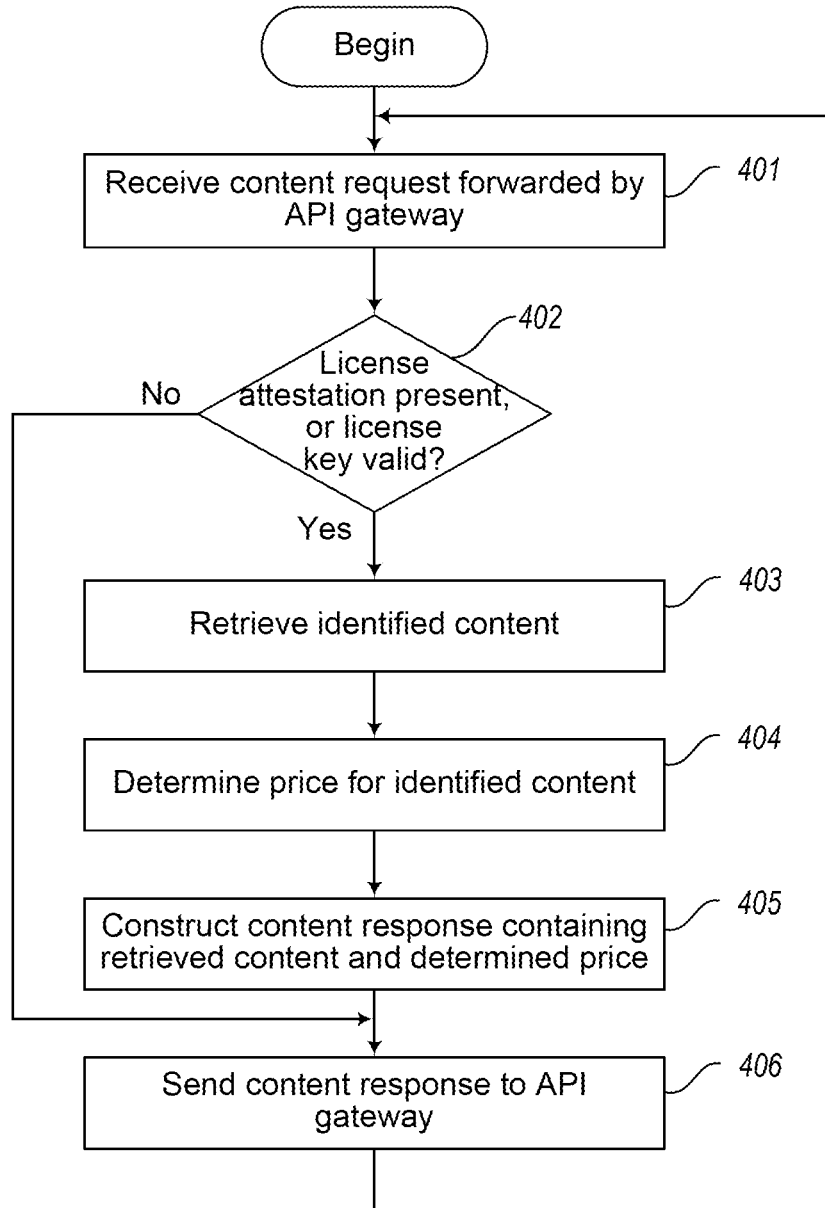
FIG. 4 is a flow diagram showing a process performed by the facility in some embodiments in the API backend to process a content request dispatched by the API gateway.

FIGS. 3 and 4 are flow diagrams showing processes performed by the facility in the API gateway and API backend in order to process content requests sent by customer applications.

FIG. 3 is a flow diagram showing a process performed by the facility in some embodiments in the API gateway. In act 301, the facility receives a content request that contains a customer key, a license attestation or license key, and identification of the content. In some embodiments, each content request contains a customer key identifying the caller as a registered customer of the facility. The content request further includes information identifying the content being requested, which in various embodiments includes one or more content unit identifier values; one or more content unit group identifier values; and/or a content unit type. In some embodiments, as is discussed further below, the facility establishes separate API endpoints for different content unit types. In some embodiments, the facility receives and processes requests for content of different types at the same endpoint. The content request also contains either a license attestation or a license key; the license attestation is an attestation on behalf of the caller or a customer of the caller that this party knows the identity of a license that applies to the requested content; understands the contents of that license; and is complying with that license. The license key identifies the caller as a licensee in good standing with the licensor of the requested content.

In act 302, if the customer key contained in the content request received in act 301 is determined by the facility to be valid, then the facility continues in act 303, else the facility continues in act 301. In act 303, the facility forwards the content request received in act 301 to the API backend.

FIG. 4 is a flow diagram showing a process performed by the facility in some embodiments in the API backend to process a content request dispatched by the API gateway. In various embodiments, the API backend and API gateway execute in the same server or different servers. In various embodiments, the API gateway and API backend are hosted in the same cloud service or different cloud services.

In act 401, the facility receives a content request forwarded by the API gateway. In act 402, if a license attestation is present in the content request, or the content request contains a license key that a facility determines to be valid, then the facility continues in act 403, else the facility continues in act 406. In some embodiments (not shown), the facility omits the test in act 402 for content units that it determines are not subject to any license. In act 403, the facility retrieves the content unit identified by the content request, such as from a content repository. In some embodiments (not shown), in act 403, the facility generates one or more dynamic content units identified by the content request. In act 404, the facility determines a price for the identified content. In some embodiments, in act 404, the facility compares each identified content unit to a price list to identify the price list entry having the best match with the content unit, and applies the price specified by that price list entry. In some embodiments, this involves identifying the lowest-level price list entry that matches each identified content unit. In act 405, the facility constructs a content response containing the units of content retrieved in act 403, as well as the aggregate price determined for the content in act 405. In act 406, the facility sends the content response constructed in act 405 to the API gateway. After act 406, the facility continues in act 401.

Those skilled in the art will appreciate that the acts shown in FIG. 4 and in each of the flow diagrams discussed herein may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Returning to FIG. 3, in act 304, the facility receives in the API gateway the content response set by the API backend. In act 305, the facility charges to the customer as a response to the content request received in act 301. After act 306, the facility continues in act 301 to receive the next content request.

Figure 5:
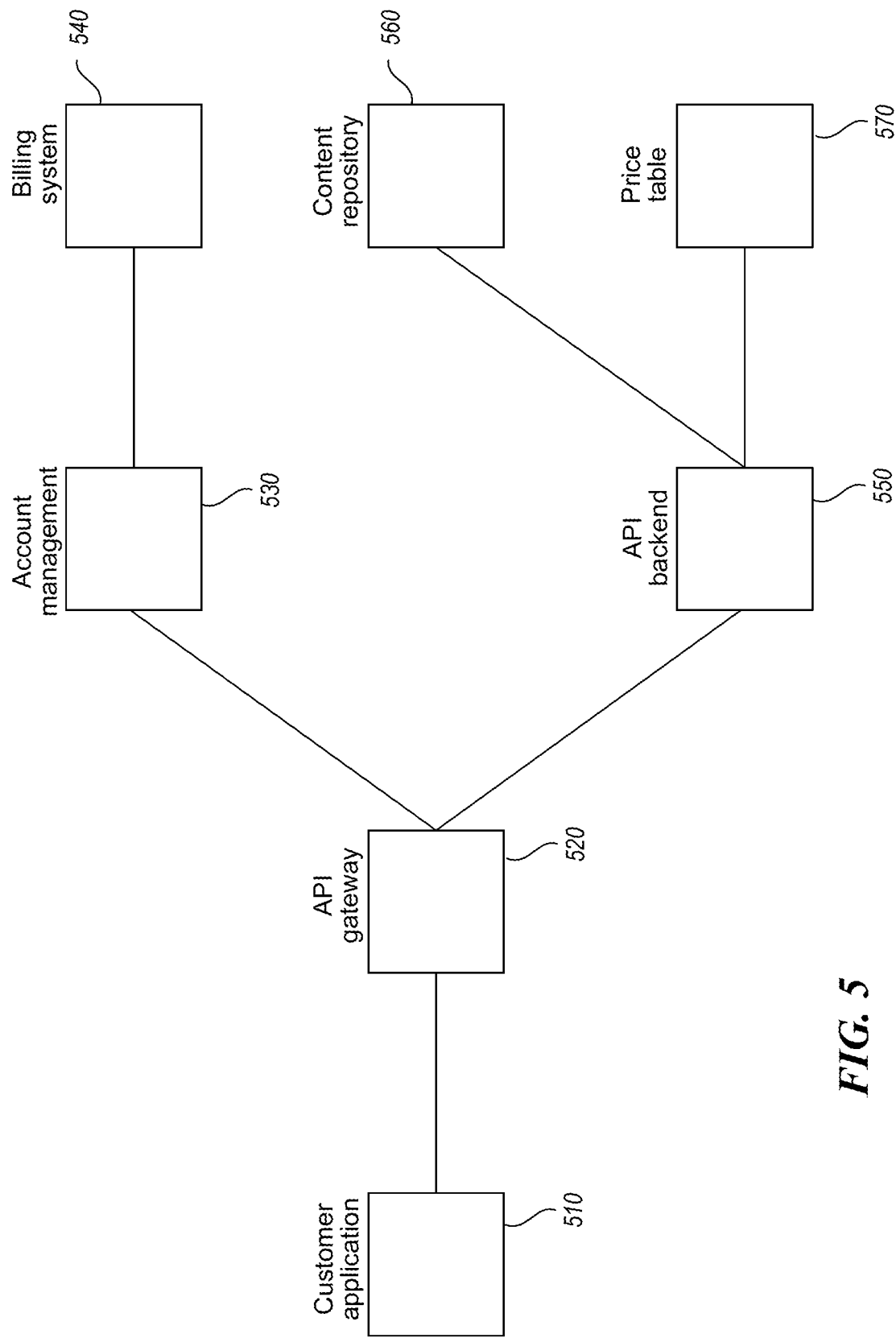
FIG. 5 is a component diagram showing in more detail the facility's organization.

FIG. 5 is a component diagram showing in more detail the facility's organization. It shows the customer application 510 calling an API gateway 520. The API gateway in turn calls an account management component 530 containing information about each valid customer. The account management component calls a billing system 540 that handles the process of charging customers for the content they request. Also called by the API gateway is the API backend 550 which retrieves requested content units from the content repository 560, and accesses a price table 570 in order to determine the price of content units retrieved for a particular content request.

Figure 6:
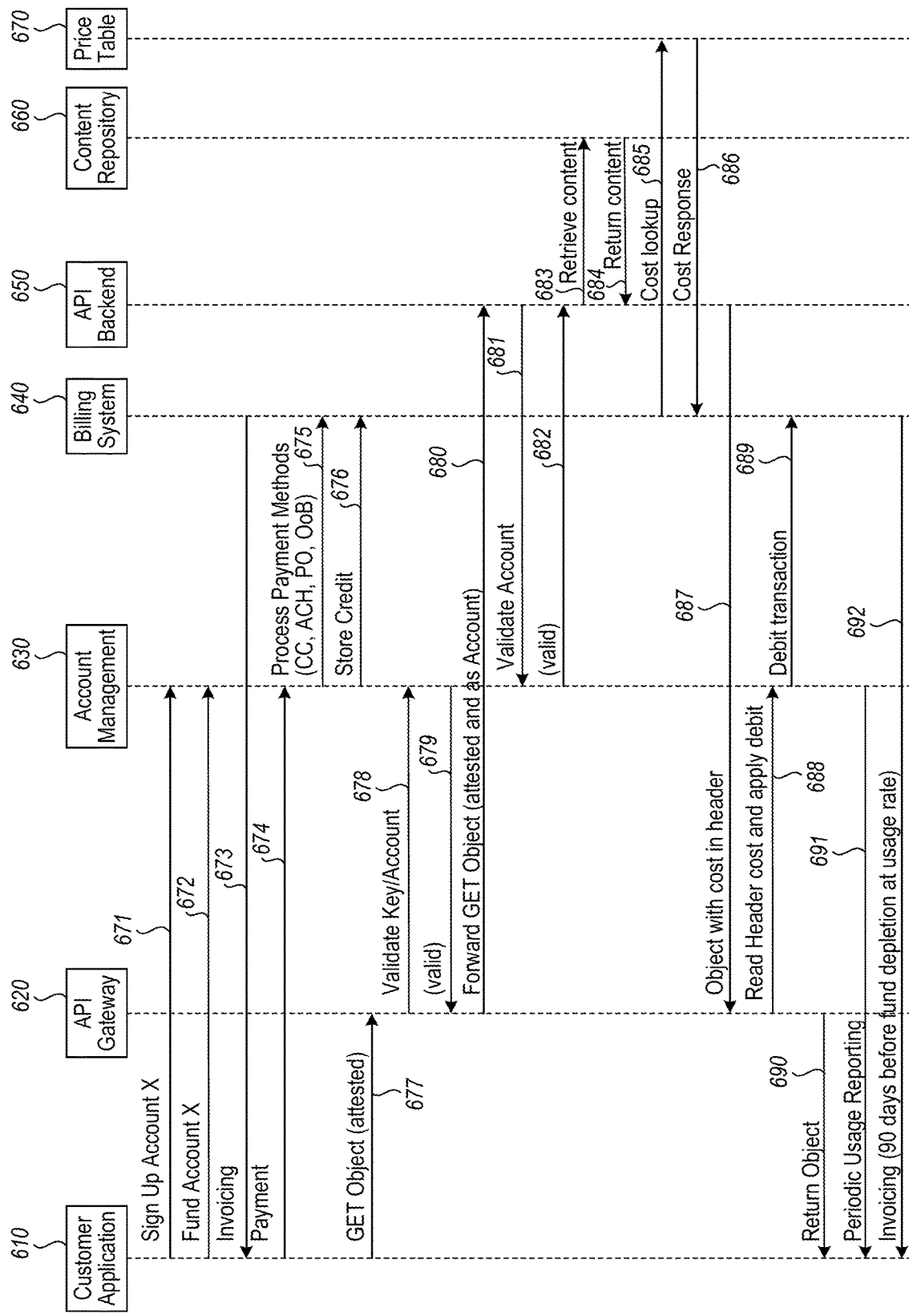
FIG. 6 is a data flow diagram showing interactions between the facility components shown in FIG. 5.

FIG. 6 is a data flow diagram showing interactions between the facility components shown in FIG. 5. It shows that the customer application 610 signs up 671 for an account with the account management component 630 and specifies a payment type, such as credit card, direct ACH withdrawal, purchase order/check, etc. The account management component creates this account with the specified payment information, and returns to the customer application an API key that can be used by the customer application to call the API gateway. The customer application further funds 672 this account with the account management component. The billing system 640 sends invoicing communication 673 to the customer application. In some embodiments, these invoicing communications provide details or summaries of content retrieval requests received from and processed for the customer and associated price. In various embodiments, the invoicing communications show the prepaid balance of the customer's prepaid account—which may merit additional payments to restore the prepaid balance to an acceptable level; or, for a charge account, indicates an amount due for the recently-processed content requests. The customer application sends payment 674 to the account management component, which in turn calls the billing system to process 675 payment methods present in the payment. After processing the payment methods, the account management component calls the billing system in order to add 676 an API usage credit corresponding to the payment to the customer's account.

The customer application calls the API gateway 620 with a content request, here shown as a "GET object" request 677 containing a license attestation. The API gateway validates 678 the customer key with the account management component, which sends a validation response 679. Having validated the customer's account using the customer key, the API gateway forwards 680 the GET object request to the API backend 650. In some embodiments, the API backend again validates 681 the customer account with the account management component, which sends a response 682 to the API backend.

The API backend calls 683 a content repository 660 to retrieve (and/or generate) content units identified by the GET object request. The content repository responds 684 with these content units. The API backend calls or accesses 685 a price table 670 to look up the price of each content unit identified in the GET object request. The API backend receives 686 a response from the price table specifying these prices for content units. The API backend uses the retrieved content units to generate a content object; attaches the individual or total content unit prices in the content object's header; and forwards 687 this content object to the API gateway. The API gateway reads the cost on the header of the content object, and instructs 688 the account management system to apply a debit for this amount to the customer's account. The account management component sends 689 a debit transaction for this amount against the customer's account to the billing system, which applies the debit to the customer's balance. The API gateway returns 690 the content units received from the API backend to the customer application.

In some embodiments, the account management component sends 691 periodic facility usage reporting to the customer application. In some embodiments, the billing system sends 692 invoices seeking additional customer deposits in the prepaid account certain periods of times before its projected exhaustion, such as ninety days in advance.

An example of the operation of the facility follows. In the example, the facility operates GET object (i.e., content request) endpoints for each of five content unit types: an AuthorityDocumentList, an AuthorityDocument, a Citation, a Mandate, and a Control. This example is shown visually by FIG. 7.

Figure 7:
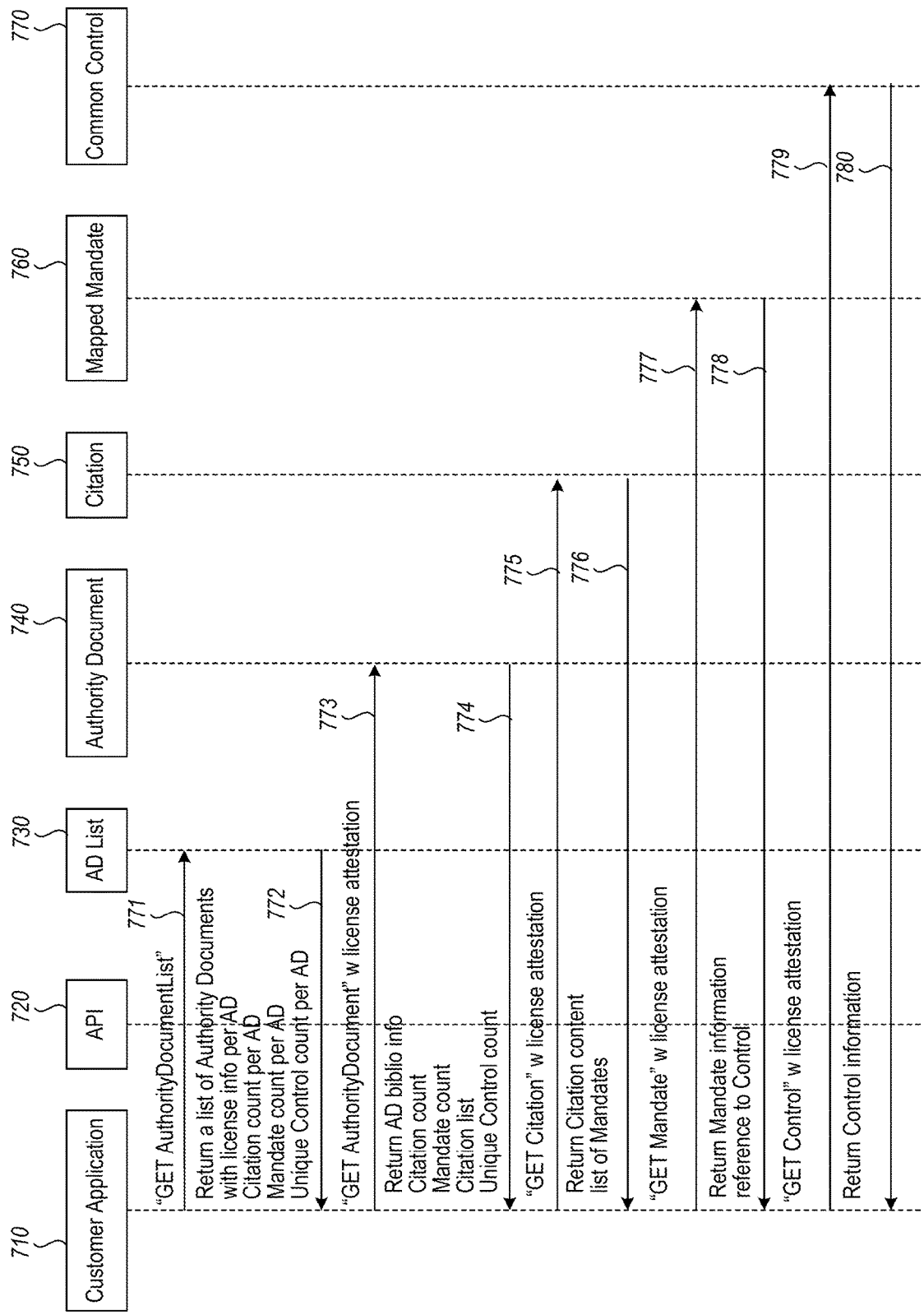
FIG. 7 is a data flow diagram showing a sample set of interactions between a customer application and the facility to retrieve compliance content units of different types.

FIG. 7 is a data flow diagram showing a sample set of interactions between a customer application and the facility to retrieve compliance content units of different types. First, the customer application calls 771 the GET AuthorityDocumentList endpoint in order to obtain an authority document list object listing available authority documents. In some embodiments, this endpoint returns 772 a list of all authority documents available for the facility. In some embodiments, calls to this endpoint include a parameter used to filter the authority documents included in the authority document list, such as a search query, one or more attribute/value pairs, etc. In some embodiments, calls to the endpoint include a parameter indicating whether the caller attests to compliance with a license that applies to the authority document list. The body of example response to a call to this endpoint is shown below in Table 1.

TABLE 1

```
 1    {
 2        "@type": "AuthorityDocument" ,
 3        "LicenseInfo": {
 4            "@type": "LicenseInfo",
 5            "availability": "licensed",
 6            "license_url": "https://unifiedcompliance.com/???",
 7            "licensor_id": 1
 8        },
 9        "@id": "https://ucf-paid-content-
                  prototype.p.rapidapi.com/paid/authority-
                  document/3288",
10        "element_id": 3288,
11        "property_name": "published_name",
12        "property_value": "Trust Services Criteria"
```

TABLE 1-continued

```
13    },
14    {
15        "@type": "AuthorityDocument",
16        "LicenseInfo": {
17            "@type": "LicenseInfo",
18            "availability": "unlicensed",
19            "license_url": "https://unifiedcompliance.com/???",
20            "licensor_id": 1
21        },
22        "@id": "https: //ucf-paid-content-
                  prototype.p.rapidapi.com/paid/authority-
                  document/3289",
23        "element_id": 3289,
24        "property_name": "published_name",
25        "property_value": "United States Code - 15 U.S.C.
                  278g-3a to 278g-3e, IoT
                  Cybersecurity Improvement Act of 2020"
26    },
```

The authority document list object shows two authority documents, a first in lines 9-21, and a second in lines 22-26. The customer application can select one of these listed authority documents to retrieve using the GET AuthorityDocument endpoint. Because in some embodiments the facility processes calls to the GET AuthorityDocumentList endpoint without charge, no header is shown for the sample response shown in Table 1.

To continue in the example, the customer application calls 773 the GET AuthorityDocument endpoint for the authority document shown in lines 9-21, using a content identifier "https://ucf-paid-content-prototype.p.rapidapi.com/paid/authority-document/3288," which is included in line 9. The facility responds 774 to this request with the AuthorityDocument shown below in Table 2.

TABLE 2

```
 1    {
 2        "@context": "https://grcschema.org/",
 3        "@type": "AuthorityDocument",
 4        "availability": "For Purchase",
 5        "@id": "https://ucf-paid-content-
                  prototype.p.rapidapi.com/paid/authority-
                  document/3288",
 6        "official_name": "Trust Services Criteria, (includes
                  March 2020 updates)",
 7        "published_name": "Trust Services Criteria",
 8        "type": "Self-Regulatory Body Requirement",
 9        "citation_format": "¶ (Numbered Paragraphs)",
10        //...Other Data Properties
11        "CitationCount": {
12            "@type": "CitationCount",
13            "citation_count": 511,
14            "mandate_count": 716
15        },
16        "Citations": {
17            "@set": [
18                {
19                    "@id": "https: //ucf-paid-content-
                          prototype.p.rapidapi.com/paid/citation/2112
                          76",
20                    "@type": "Citation",
21                    "element_id": 211276,
22                    "reference": "CC6.8 ¶ 2 Bullet 4 Uses Antivirus
                          and Anti-Malware
                          Software",
23                    "authority_document_fk": 3288,
24                    "LicenseInfo": {
25                        "@type": "LicenseInfo",
26                        "availability": "unlicensed",
27                        "license_url": "https://unifiedcompliance.com/???",
28                        "licensor_id": 1
29                    }
30                },
31                {
```

TABLE 2-continued

```
32          "@id": "https://ucf-paid-content-
                prototype.p.rapidapi.com/paid/citation/211622",
33          "@type": "Citation",
34          "element_id": 211622,
35          "reference": "CC7.3 ¶ 2 Bullet 1 Responds to
                Security Incidents",
36          "authority_document_fk": 3288,
37          "LicenseInfo": {
38              "@type": "LicenseInfo",
39              "availability": "unlicensed",
40              "license_url": "https://unifiedcompliance.com/???",
41              "licensor_id": 1
42          }
43      },
44      // ... More Citations
45      ]
46   },
47   "LicenseInfo": {
48      "@type": "LicenseInfo",
49      "availability": "licensed",
50      "license_url": "https://unifiedcompliance.com/???",
51      "licensor_id": 1
52   }
53   // ... Other Data Objects
54 }
```

The returned AuthorityDocument object includes identifying information for the authority document in lines 3-9. It further includes an indication of the number of citations that occur in the authority document in line 13, and an indication of the number of mandates that occur in the authority document on line 14. The AuthorityDocument object further includes identifying information about each of the 716 citations: for brevity, only two of these are shown in Table 2, a first in lines 18-30, and a second in lines 31-45. The AuthorityDocument object further includes license information in lines 47-51 about the authority document and its citations. This includes an indication of whether a license applies to the authority document and citations in line 49, and a link on line 50 to that license for access and review.

Table 3 below shows the header of the response to the GET AuthorityDocument endpoint call shown in Table 3.

TABLE 3

```
1  {
2      "access-control-allow-credentials " : "true",
3      "access-control-allow-headers": "Content-Type, Authorization,
                Accept, Accept-Encoding",
4      "access-control-allow-methods": "POST, GET, OPTIONS, PUT,
                PATCH, DELETE",
5      // . . . More Objects
6      "x-citation-cost": "$10.00",
7      "x-mandate-cost": "$40.00",
8      "x-object-cost": "$1.00",
9      "x-permitted-cross-domain-policies": "none",
10     "x-rapidapi-region": "AWS - us-west-2",
11     "x-rapidapi-version": "1.2.8",
12     "x-xss-protection": "1; mode=block"
13 }
```

Line 8 of the header shows the aggregate cost of this response, $1.00. Lines 6 and 7 show the per-content unit cost of types of content units referred to in the response: $10.00 for citation content units, and $40.00 for mandate content units.

To continue the example, the customer application selects the citation described in lines 18-30 of the AuthorityDocument object shown in Table 2, and uses the ID "https://ucf-paid-content-prototype.p.rapidapi.com/paid/citation/211276" in line 19 in its call 775 to the GET Citation endpoint. The Citation object is returned 776 by the facility in the body of the response shown below in Table 4.

TABLE 4

```
1  {
2      "availability": "For Purchase",
3      "@context": "https://grcschema.org/",
4      "@id": "https: //ucf-paid-content-
                prototype.p.rapidapi.com/paid/citation/211276",
5      "guidance": "Antivirus and anti-malware software
                is implemented
                and maintained to provide for the interception
                or detection and remediation of malware.",
6      "element_id": 211276,
7      "reference": "CC6.8 ¶ 2 Bullet 4 Uses Antivirus and
                Anti-Malware Software",
8      "CoreMetaData": {
9          "modified_audit_id": null,
10         "live_status": true,
11         "superseded_by": null,
12         "created_audit_id": null,
13         "checksum": 1,
14         "notes": null,
15         "date_modified": "2021-02-12",
16         "date_created": "2021-02-02",
17         "validated": null
18     },
19     "LicenseInfo": {
20         "@type": "LicenseInfo",
21         "availability": "licensed",
22         "license_url": "https://unifiedcompliance.com/???",
23         "licensor_id": 1
24     },
25     "language": "eng",
26     "parent_id": 212182,
27     "authority_document_id": 3288,
28     "@type": "Citation",
29     "Mandates": {
30         "@set": [
31             {
32                 "LicenseInfo": {
33                     "@type": "LicenseInfo",
34                     "availability": "licensed",
35                     "license_url" :
                           "https:// unifiedcompliance.com/???",
36                     "licensor_id": 1
37                 },
38                 "@id" : "https://ucf-paid-content-
                           prototype.p.rapidapi.com/paid/mandate/211276",
39                 "@type": "Mandate",
40                 "element_id": 211276,
41                 "citation_fk": 211276
42             }
43         ]
44     },
45     "mandate_count": 1
46 }
```

The citation's identifier is shown in line 4, and its textual contents are shown in line 5. Its location in the authority document is shown in line 7. Metadata for the citation is shown in lines 8-18. Licensing information for the citation is shown in lines 19-24. A mandate interpreting the citation is described in lines 30-44. Lines 32-36 contain license information for the mandate, and lines 38-41 contain identifying information for the mandate.

Table 5 below shows the header for the response to the GET Citation endpoint call shown above in Table 4.

TABLE 5

```
1  {
2      "access-control-allow-credentials " : "true",
3      "access-control-allow-headers ": "Content-Type, Authorization,
                Accept, Accept-Encoding",
```

TABLE 5-continued

```
4    "access-control-allow-methods": "POST, GET, OPTIONS, PUT,
                                      PATCH, DELETE",
5    // . . . More Objects
6    "x-control-cost": "$10.00",
7    "x-mandate-cost": "$40.00",
8    "x-object-cost": "$10.00",
9    "x-permitted-cross-domain-policies": "none",
10   "x-rapidapi-region": "AWS - us-west-2",
11   "x-rapidapi-version": "1.2.8",
12   "x-xss-protection": "1; mode=block"
13 }
```

Line 8 of the header shows the aggregate cost of the response to the GET Citation endpoint, $10.00. Lines 6-7 show the per-content unit costs of content types referred to in the body of the response, $10.00 for control content units, and $40.00 for mandate content units.

Continuing the example, the customer application calls 777 the GET Mandate endpoint using the mandate identifier: "https://ucf-paid-content-prototype.p.rapidapi.com/paid/mandate/211276," in line 38 of the citation object. In response, the facility returns 778 the Mandate Object in the response body shown below in Table 6.

TABLE 6

```
1  {
2    "sort_value": 5,
3    "@context": "https://grcschema.org/",
4    "@id": "https://ucf-paid-content-
                        prototype.p.rapidapi.com/paid/mandate/21127
                        6",
5    "citation_id": 211276,
6    "guidance_as_tagged": "{antivirus software} Antivirus and anti-
                        malware
                        software is implemented and maintained to
                        provide for the interception or detection
                        and remediation of malware.",
7    "guidance": "Antivirus and anti-malware software is implemented
                        and
                        maintained to provide for the interception
                        or detection and remediation of malware.",
8    "MatchedControl": {
9        "@type": "MatchedControl",
10       "attestation_url": "https://www.unifiedcompliance.com/???",
11       "certainty": null,
12       "method": null,
13       "Control": {
14           "@type": "Control",
15           "@id": "https://ucf-paid-content-
                        prototype.p.rapidapi.com/paid/control/575",
16           "LicenseInfo": {
17               "@type": "LicenseInfo",
18               "availability": "licensed",
19               "license_url": "https://unifiedcompliance.com/???",
20               "licensor_id": 1
21           },
22           "element_id": 575,
23           "control_authority_id": 1
24       }
25   },
26   "element_id": 211276,
27   "reference": "CC6.8 ¶ 2 Bullet 4 Uses Antivirus and Anti-Malware
                        Software",
28   "CoreMetaData": {
29       "modified_audit_id": null,
30       "live_status": true,
31       "superseded_by": null,
32       "created_audit_id": null,
33       "checksum": 1,
34       "notes": null,
35       "date_modified": "2021-02-12",
36       "date_created": "2021-02-02",
37       "validated": null
38   },
39   "sort_id": "006 026 005",
40   "LicenseInfo": {
41       "@type": "LicenseInfo",
42       "availability": "licensed",
43       "license_url": "https://unifiedcompliance.com/???",
44       "licensor_id": 1
45   },
46   "language": "eng",
47   "authority_document_id": 3288,
48   "@type": "Mandate",
49   "TaggedSentence": {
```

TABLE 6-continued

| | |
|---|---|
| 50 | "@context": "https://grcschema.org/", |
| 51 | "@id": null, |
| 52 | "sentence": "{antivirus software} Antivirus and anti-malware software is implemented and maintained to provide for the interception or detection and remediation of malware.", |
| 53 | "element_id": 89267, |
| 54 | "@type": "TaggedSentence", |
| 55 | "TaggedPhrases": [ |
| 56 |     { |
| 57 |         "@context": "https://grcschema.org/", |
| 58 |         "tagged_sentence_fk": 89267, |
| 59 |         "@id": null, |
| 60 |         "start": 1, |
| 61 |         "type": "Primary Noun", |
| 62 |         "TaggedPhraseTerm": { |
| 63 |             "@type": "TaggedPhraseTerm", |
| 64 |             "element_id": 3459, |
| 65 |             "nonstandard": false, |
| 66 |             "preferred_term": null |
| 67 |         }, |
| 68 |         "element_id": 497882, |
| 69 |         "nonstandard": true, |
| 70 |         "term_preferred_term": null, |
| 71 |         "end": 19, |
| 72 |         "@type": "TaggedPhrase", |
| 73 |         "TaggedPhraseDefinition": { |
| 74 |             "@type": "TaggedPhraseDefinition", |
| 75 |             "element_id": 30635, |
| 76 |             "definition": "A program that monitors a computer or network to identify all viruses and prevent or contain virus incidents.", |
| 77 |             "other_form": null, |
| 78 |             "word_type": "Asset" |
| 79 |         }, |
| 80 |         "term_id": 3459, |
| 81 |         "term_nonstandard": false |
| 82 |     }, |
| 83 |     { |
| 84 |         "@context": "https://grcschema.org/", |
| 85 |         "tagged_sentence_fk": 89267, |
| 86 |         "@id": null, |
| 87 |         "start": 35, |
| 88 |         "type": "Primary Noun", |
| 89 |         "TaggedPhraseTerm": { |
| 90 |             "@type": "TaggedPhraseTerm", |
| 91 |             "element_id": 252184, |
| 92 |             "nonstandard": false, |
| 93 |             "preferred_term": null |
| 94 |         }, |
| 95 |         "element_id": 497883, |
| 96 |         "nonstandard": true, |
| 97 |         "term_preferred_term": null, |
| 98 |         "end": 56, |
| 99 |         "@type": "TaggedPhrase", |
| 100 |         "TaggedPhraseDefinition": { |
| 101 |             "@type": "TaggedPhraseDefinition", |
| 102 |             "element_id": 198576, |
| 103 |             "definition": "A program that monitors a computer or network to identify all major types of malware: virus, trojan horse, spyware, Adware, worms, rootkits, etc.", |
| 104 |             "other_form": null, |
| 105 |             "word_type": "Asset" |
| 106 |         }, |
| 107 |         "term_id": 252184, |
| 108 |         "term_nonstandard": false |
| 109 |     }, |
| 110 |     { |
| 111 |         "@context": "https://grcschema.org/", |
| 112 |         "tagged_sentence_fk": 89267, |
| 113 |         "@id": null, |
| 114 |         "start": 60, |
| 115 |         "type": "Primary Verb", |
| 116 |         "TaggedPhraseTerm": { |
| 117 |             "@type": "TaggedPhraseTerm", |
| 118 |             "element_id": 17589, |

TABLE 6-continued

```
119              "nonstandard": false,
120              "preferred_term": 253298
121          },
122          "element_id": 497884,
123          "nonstandard": true,
124          "term_preferred_term": 253298,
125          "end": 86,
126          "@type": "TaggedPhrase",
127          "TaggedPhraseDefinition": {
128              "@type": "TaggedPhraseDefinition",
129              "element_id": 1259,
130              "definition": "To lay the groundwork for
                     something and
                     uphold it or ensure continuation by
                     requiring maintenance.",
131              "other_form": null,
132              "word_type": "Verb"
133          },
134          "term_id": 17589,
135          "term_nonstandard": false
136      }
137      ],
138      "correct": true
139  }
140 }
```

In lines 49-138, the Mandate Object describes the interpretation of the underlying citation. The Mandate Object further includes information in lines 8-24 about a control that is "matched" or "mapped" to the mandate, and potentially other mandates in the same or different authority documents, to identify them as equivalent. In lines 16-21, this section of the metadata object contains license information for the control.

Table 7 below shows the header of the response to the GET Mandate endpoint call response whose body is shown above in Table 6.

TABLE 7

```
1  {
2      "access-control-allow-credentials ": "true",
3      "access-control-allow-headers ": "Content-Type, Authorization,
                             Accept, Accept-Encoding",
4      "access-control-allow-methods": "POST, GET, OPTIONS, PUT,
                             PATCH, DELETE",
5      // ... More Objects
6      "x-control-cost": "$10.00",
7      "x-object-cost": "$10.00",
8      "x-permitted-cross-domain-policies": "none",
9      "x-rapidapi-region": "AWS - us-west-2",
10     "x-rapidapi-version": "1.2.8",
11     "x-xss-protection" :
12 }
```

Line 7 of the header shows the aggregate cost of this response to be $10.00. Line 6 shows the per-content unit cost of control units to be $10.00.

To continue the example, the customer application calls 779 the GET Control endpoint using the control ID "https://ucf-paid-content-prototype.p.rapidapi.com/paid/control/575," that is included in line 15 of the Mandate Object. The facility responds 780 with the Control Object in the response body shown below in Table 8.

TABLE 8

```
1  {
2      "ControlAuthority" : {
3          "@type": "ControlAuthority",
4          "control_authority_abbreviation": "UCF",
```

TABLE 8-continued

```
5          "control_authority_id": 1,
6          "control_authority_name": "Unified Compliance"
7      },
8      "sort_value": 2,
9      "@context": "https://grcschema.org/",
10     "@id": "https://ucf-paid-content-
                             prototype.p.rapidapi.com/
                             paid/control/575",
11     "name": "Install security and protection software,
           as necessary.",
12     "type": "Configuration",
13     "classification": "Preventive",
14     "impact_zone": "Technical security",
15     "element_id": 575,
16     "CoreMetaData": {
17         "modified_audit_id": null,
18         "live_status": true,
19         "superseded_by": null,
20         "created_audit_id": null,
21         "checksum": 9,
22         "notes": null,
23         "date_modified": "2021-05-04",
24         "date_created": "2005-12-28",
25         "validated": null
26     },
27     "sort_id": "001 004 018 002",
28     "LicenseInfo": {
29         "@type": "LicenseInfo",
30         "availability": "licensed",
31         "license_url": "https://unifiedcompliance.com/???",
32         "licensor_id": 1
33     },
34     "language": "eng",
35     "parent id": 574,
36     "@type": "Control",
37     "Metric": {
38         "@type": "Metric",
39         "metric_calculation": null,
40         "metric_image reference": null,
41         "metric_information_source": null,
42         "metric_name": null,
43         "metric_presentation_format": null,
44         "metric_target_result": null
45     },
46     "TaggedSentence": {
47         "@context": "https://grcschema.org/",
48         "@id": null,
49         "sentence": "Install security and protection
                             software, as necessary.",
```

TABLE 8-continued

```
50              "element_id": 94450,
51              "@type": "TaggedSentence",
52              "TaggedPhrases": [
53                  {
54                      {"@context": "https://grcschema.org/",
55                      "tagged_sentence_fk": 94450,
56                      "@id": null,
57                      "start": 0,
58                      "type": "Primary Verb",
59                      "TaggedPhraseTerm": {
60                          "@type": "TaggedPhraseTerm",
61                          "element_id": 4329,
62                          "nonstandard": false,
63                          "preferred_term": null
64                      },
65                      "element_id": 524288,
66                      "nonstandard": false,
67                      "term_preferred_term": null,
68                      "end": 7,
69                      "@type": "TaggedPhrase",
70                      "TaggedPhraseDefinition": {
71                          "@type": "TaggedPhraseDefinition",
72                          "element_id": 26557,
73                          "definition": "In Computing: to set up
                                or place software
                                for use on a machine or network.",
74                          "other_form": null,
75                          "word_type": "Verb"
76                      },
77                      "term_id": 4329,
78                      "term_nonstandard": false
79                  },
80                  {
81                      "@context": "https://grcschema.org/",
82                      "tagged_sentence_fk": 94450,
83                      "@id": null,
84                      "start": 8,
85                      "type": "Primary Noun",
86                      "TaggedPhraseTerm": {
87                          "@type": "TaggedPhraseTerm",
88                          "element_id": 252187,
89                          "nonstandard": false,
90                          "preferred_term": null
91                      },
92                      "element_id": 524289,
93                      "nonstandard": false,
94                      "term_preferred_term": null,
95                      "end": 40,
96                      "@type": "TaggedPhrase",
97                      "TaggedPhraseDefinition": {
98                          "@type": "TaggedPhraseDefinition",
99                          "element_id": 198581,
100                         "definition": "Software that is put in
                                place to scan a
                                computer or network in order to
                                detect and mitigate threats such as
                                malware and cracking.",
101                         "other_form": null,
102                         "word_type": "Asset"
103                     },
104                     "term_id": 252187,
105                     "term_nonstandard": false
106                 }
107             ],
108             "correct": true
109         }
110     }
```

In addition to identifying information and license information, the content of the control is shown in lines 46-109 of the Control Object.

Table 9 below shows the header of the response to the GET Control endpoint call shown above in Table 8.

TABLE 9

```
1   {
2       "access-control-allow-credentials ": "true",
3       "access-control-allow-headers": "Content-Type, Authorization,
                Accept, Accept-Encoding",
4       "access-control-allow-methods": "POST, GET, OPTIONS, PUT,
                PATCH, DELETE",
5       // ... More Objects
6       "x-object-cost": "$10.00"
7       "x-permitted-cross-domain-policies": "none",
8       "x-rapidapi-region": "AWS - us-west-2",
9       "x-rapidapi-version": "1.2.8",
10      "x-xss-protection": "1; mode=block"
11  }
```

Line 6 of the header in Table 9 shows that the aggregate cost of the response to the GET Control endpoint is $10.00.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for processing application programming interface (API) requests to retrieve license-compliant content, the method comprising:
    establishing, by a server, a plurality of API endpoints each tailored to a respective compliance content type of a plurality of compliance content types, wherein the plurality of API endpoints forms a hierarchy of linked responders to API invocations;
    receiving, from a requesting application and by a first API endpoint of the plurality of API endpoints that is tailored to a first compliance type of the plurality of compliance content types, a first API invocation comprising:
        a first argument identifying one or more units of compliance content of the first compliance type to return, and
        a second argument indicating whether the requesting application attests that the requesting application is compliant with a license that applies to the units of compliance content identified by the first argument;
    responsive to determining that the second argument indicates that the requesting application attests that the requesting application is compliant with the license that applies to the units of compliance content identified by the first argument:
        constructing a first response message containing the one or more units of compliance content of the first compliance type identified by the first argument, the one or more units of compliance content of the first compliance type including content identifying information that identifies one or more units of compliance content of a second compliance type of the plurality of compliance content types and access to a license that applies to the one or more units of compliance content of the second compliance type, which further including a mandate object that includes, for a particular mandate:
a copy of the mandate; and
for a control that is a distinct unit of the one or more units of compliance content of the second compliance type, and to which the mandate has been mapped constituting a deduplication of the mandate against one or more equivalent other mandates:
identifying information for the control usable by the requesting application to retrieve an object containing the control using the second API endpoint; and
a link to a license that applies to the control; and
transmitting the first response message to the requesting application, in response to the first API invocation;
receiving, from the requesting application and by a second API endpoint of the plurality of API endpoints that is tailored to the second compliance type of the plurality of compliance content types, a second API invocation comprising:
a third argument identifying the one or more units of compliance content of the second compliance type to return, using at least a portion of the content identifying information included in the first response message, and
a fourth argument indicating whether the requesting application attests that the requesting application is compliant with the license that applies to the one or more units of compliance content of the second compliance type;
responsive to determining that the fourth argument indicates that the requesting application attests that the requesting application is compliant with the license that applies to the one or more units of compliance content identified by the third argument:
constructing a second response message containing the one or more units of compliance content of the second compliance type as identified by the third argument; and
transmitting the second response message to the requesting device, in response to the second API invocation.

2. The method of claim 1 wherein the identified one or more units of compliance content of the first compliance type includes an authority document list object that includes:
for each of a plurality of authority documents that is a distinct unit of the one or more units of compliance content of the second compliance type:
identifying information for the authority document usable by the requesting application to retrieve an object containing the authority document using the second API endpoint; and
a link to a license that applies to the authority document.

3. The method of claim 1 wherein the identified one or more units of compliance content of the first compliance type includes an authority document object that includes, for a particular authority document:
for each of a plurality of citations that is a distinct unit of the one or more units of compliance content of the second compliance type and contained by the authority document:
identifying information for the citation usable by the requesting application to retrieve an object containing the citation using the second API endpoint; and
a link to a license that applies to the citation.

4. The method of claim 1 wherein the identified one or more units of compliance content of the first compliance type includes a citation object that includes, for a particular citation:
a copy of the citation; and
for a mandate that is a distinct unit of the one or more units of compliance content of the second compliance type and constitutes an interpretation of the citation:
identifying information for the mandate usable by the requesting application to retrieve an object containing the mandate using the second API endpoint; and
a link to a license that applies to the mandate.

5. The method of claim 1 wherein the identified one or more units of compliance content of the first compliance type includes a control object that includes, for a particular control:
a copy of the control.

6. One or more instances of computer-readable media not constituting transitory propagating signals, per se, the one or more instances of computer-readable media collectively having contents configured to cause a computing system to perform a method for processing application programming interface (API) requests to retrieve license-compliant content, the method comprising:
establishing, by a server, a plurality of API endpoints each tailored to a respective compliance content type of a plurality of compliance content types, wherein the plurality of API endpoints forms a hierarchy of linked responders to API invocations;
receiving, from a requesting application and by a first API endpoint of the plurality of API endpoints that is tailored to a first compliance type of the plurality of compliance content types, a first API invocation comprising:
a first argument identifying one or more units of compliance content of the first compliance type to return, and
a second argument indicating whether the requesting application attests that the requesting application is compliant with a license that applies to the units of compliance content identified by the first argument;
responsive to determining that the second argument indicates that the requesting application attests that the requesting application is compliant with the license that applies to the units of compliance content identified by the first argument:
constructing a first response message containing the one or more units of compliance content of the first compliance type identified by the first argument, the one or more units of compliance content of the first compliance type including content identifying information that identifies one or more units of compliance content of a second compliance type of the plurality of compliance content types and access to a license that applies to the one or more units of compliance content of the second compliance type, which further including a mandate object that includes, for a particular mandate:
a copy of the mandate; and
for a control that is a distinct unit of the one or more units of compliance content of the second compliance type, and to which the mandate has been mapped constituting a deduplication of the mandate against one or more equivalent other mandates:
identifying information for the control usable by the requesting application to retrieve an object containing the control using the second API endpoint; and
a link to a license that applies to the control; and
transmitting the first response message to the requesting application, in response to the first API invocation;
receiving, from the requesting application and by a second API endpoint of the plurality of API endpoints that is tailored to the second compliance type of the plurality of compliance content types, a second API invocation comprising:
a third argument identifying the one or more units of compliance content of the second compliance type to return, using at least a portion of the content identifying information included in the first response message, and
a fourth argument indicating whether the requesting application attests that the requesting application is compliant with the license that applies to the one or more units of compliance content of the second compliance type;
responsive to determining that the fourth argument indicates that the requesting application attests that the requesting application is compliant with the license that applies to the one or more units of compliance content identified by the third argument:
constructing a second response message containing the one or more units of compliance content of the second compliance type as identified by the third argument; and
transmitting the second response message to the requesting device, in response to the second API invocation.

7. The one or more instances of computer-readable media of claim 6 wherein the identified one or more units of compliance content of the first compliance type includes an authority document list object that includes:
for each of a plurality of authority documents that is a distinct unit of the one or more units of compliance content of the second compliance type:
identifying information for the authority document usable by the requesting application to retrieve an object containing the authority document using the second API endpoint; and
a link to a license that applies to the authority document.

8. The one or more instances of computer-readable media of claim 6 wherein the identified one or more units of compliance content of the first compliance type includes an authority document object that includes, for a particular authority document:
for each of a plurality of citations that is a distinct unit of the one or more units of compliance content of the second compliance type and contained by the authority document:
identifying information for the citation usable by the requesting application to retrieve an object containing the citation using the second API endpoint; and
a link to a license that applies to the citation.

9. The one or more instances of computer-readable media of claim 6 wherein the identified one or more units of compliance content of the first compliance type includes a citation object that includes, for a particular citation:
a copy of the citation; and
for a mandate that is a distinct unit of the one or more units of compliance content of the second compliance type and constitutes an interpretation of the citation:
identifying information for the mandate usable by the requesting application to retrieve an object containing the mandate using the second API endpoint; and
a link to a license that applies to the mandate.

10. The one or more instances of computer-readable media of claim 6 wherein the identified one or more units of compliance content of the first compliance type includes a control object that includes, for a particular control:
a copy of the control.

11. A system, comprising:
one or more processors; and
a memory storing contents that, when executed by the one or more processors individually or collectively, cause the system to perform a method for processing application programming interface (API) requests to retrieve license-compliant content, the method comprising:
establishing, by a server, a plurality of API endpoints each tailored to a respective compliance content type of a plurality of compliance content types, wherein the plurality of API endpoints forms a hierarchy of linked responders to API invocations;
receiving, from a requesting application and by a first API endpoint of the plurality of API endpoints that is tailored to a first compliance type of the plurality of compliance content types, a first API invocation comprising:
a first argument identifying one or more units of compliance content of the first compliance type to return, and
a second argument indicating whether the requesting application attests that the requesting application is compliant with a license that applies to the units of compliance content identified by the first argument;
responsive to determining that the second argument indicates that the requesting application attests that the requesting application is compliant with the license that applies to the units of compliance content identified by the first argument;
constructing a first response message containing the one or more units of compliance content of the first compliance type identified by the first argument, the one or more units of compliance content of the first compliance type including content identifying information that identifies one or more units of compliance content of a second compliance type of the plurality of compliance content types and access to a license that applies to the one or more units of compliance content of the second compliance type, which further including a mandate object that includes, for a particular mandate:
a copy of the mandate; and
for a control that is a distinct unit of the one or more units of compliance content of the second compliance type, and to which the mandate has been mapped constituting a deduplication of the mandate against one or more equivalent other mandates:

identifying information for the control usable by the requesting application to retrieve an object containing the control using the second API endpoint; and
a link to a license that applies to the control; and
transmitting the first response message to the requesting application, in response to the first API invocation;
receiving, from the requesting application and by a second API endpoint of the plurality of API endpoints that is tailored to the second compliance type of the plurality of compliance content types, a second API invocation comprising:
a third argument identifying the one or more units of compliance content of the second compliance type to return, using at least a portion of the content identifying information included in the first response message, and
a fourth argument indicating whether the requesting application attests that the requesting application is compliant with the license that applies to the one or more units of compliance content of the second compliance type;
responsive to determining that the fourth argument indicates that the requesting application attests that the requesting application is compliant with the license that applies to the one or more units of compliance content identified by the third argument:
constructing a second response message containing the one or more units of compliance content of the second compliance type as identified by the third argument; and
transmitting the second response message to the requesting device, in response to the second API invocation.

12. The system of claim 11 wherein the identified one or more units of compliance content of the first compliance type includes an authority document list object that includes:
for each of a plurality of authority documents that is a distinct unit of the one or more units of compliance content of the second compliance type:
identifying information for the authority document usable by the requesting application to retrieve an object containing the authority document using the second API endpoint; and
a link to a license that applies to the authority document.

13. The system of claim 11 wherein the identified one or more units of compliance content of the first compliance type includes an authority document object that includes, for a particular authority document:
for each of a plurality of citations that is a distinct unit of the one or more units of compliance content of the second compliance type and contained by the authority document:
identifying information for the citation usable by the requesting application to retrieve an object containing the citation using the second API endpoint; and
a link to a license that applies to the citation.

14. The system of claim 11 wherein the identified one or more units of compliance content of the first compliance type includes a citation object that includes, for a particular citation:
a copy of the citation; and
for a mandate that is a distinct unit of the one or more units of compliance content of the second compliance type and constitutes an interpretation of the citation:
identifying information for the mandate usable by the requesting application to retrieve an object containing the mandate using the second API endpoint; and
a link to a license that applies to the mandate.

15. The system of claim 11 wherein the identified one or more units of compliance content of the first compliance type includes a control object that includes, for a particular control:
a copy of the control.

* * * * *